May 31, 1949.    F. W. BUNCH    2,471,721
SANITARY DRINKING GLASS CLEANER
Filed Feb. 27, 1945    3 Sheets-Sheet 1
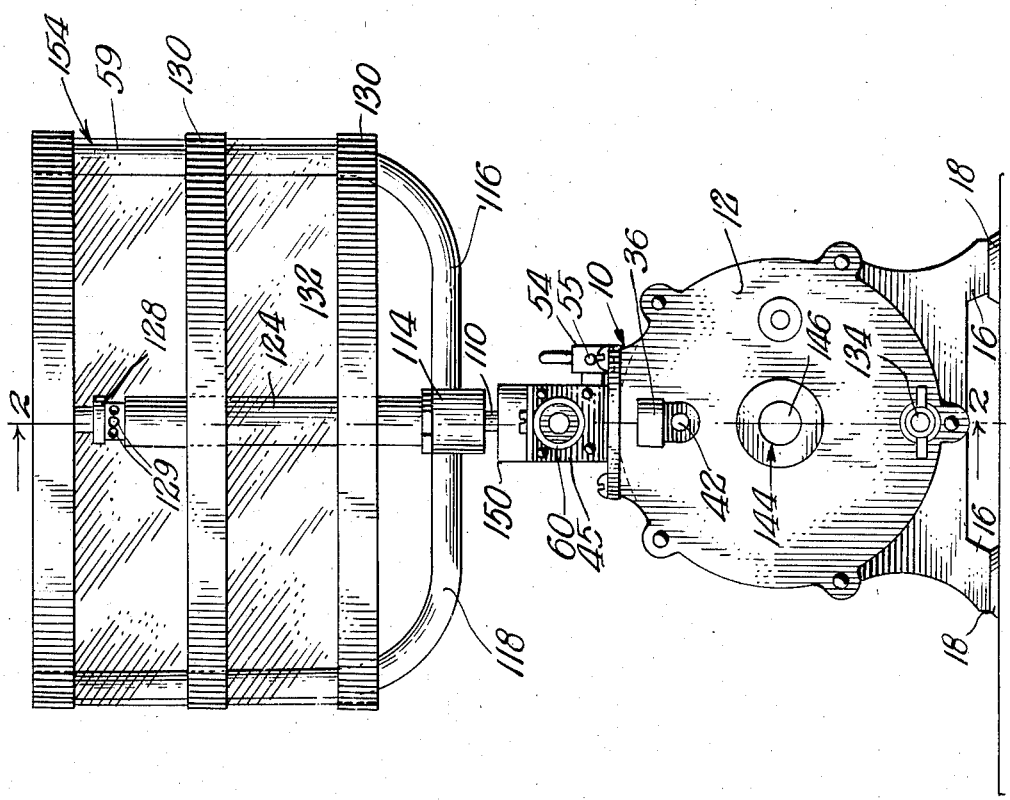
Fred William Bunch
Inventor
By Clarence A. O'Brien
and Harvey B. Jacobson
Attorneys

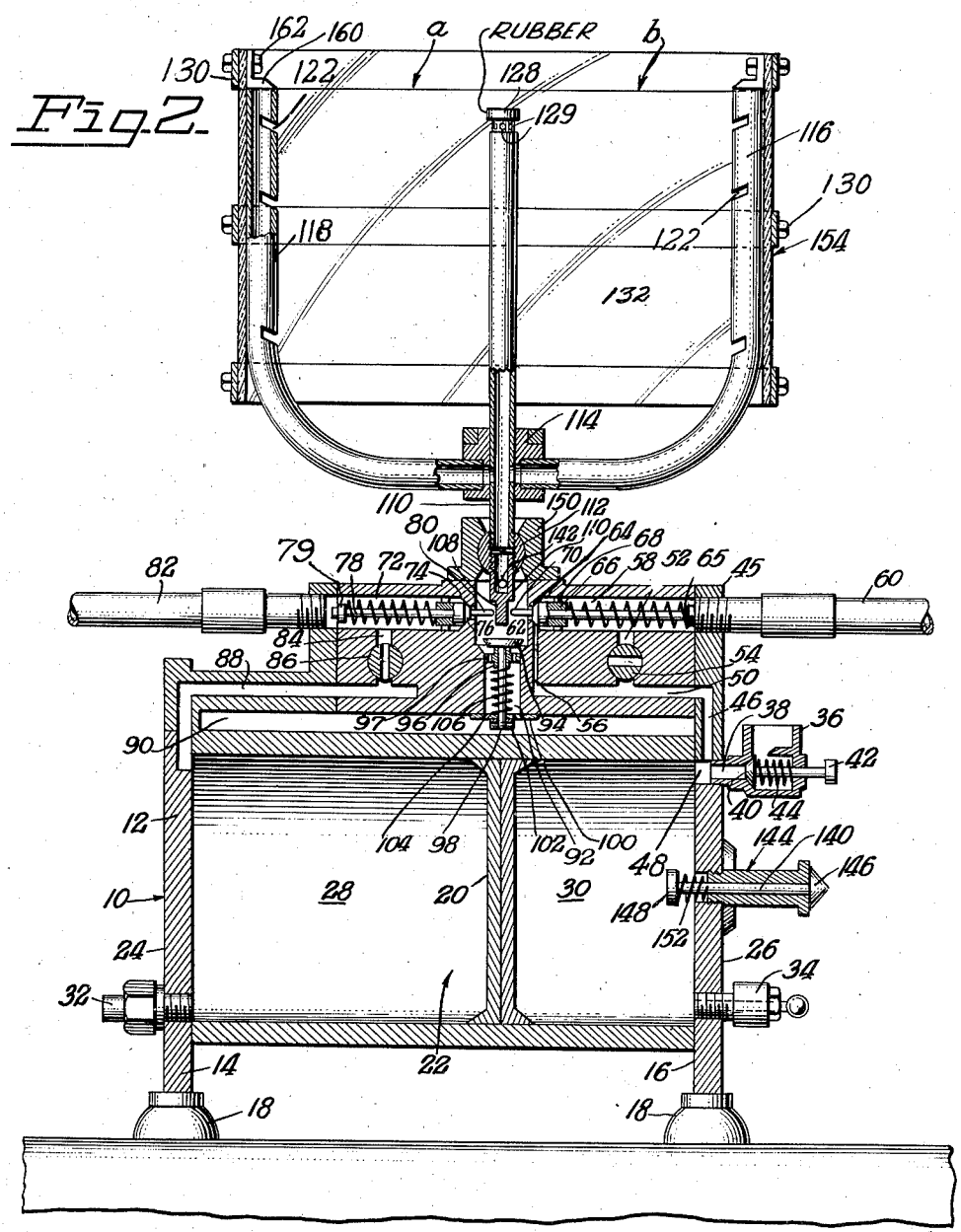

May 31, 1949.  F. W. BUNCH  2,471,721
SANITARY DRINKING GLASS CLEANER
Filed Feb. 27, 1945  3 Sheets-Sheet 3
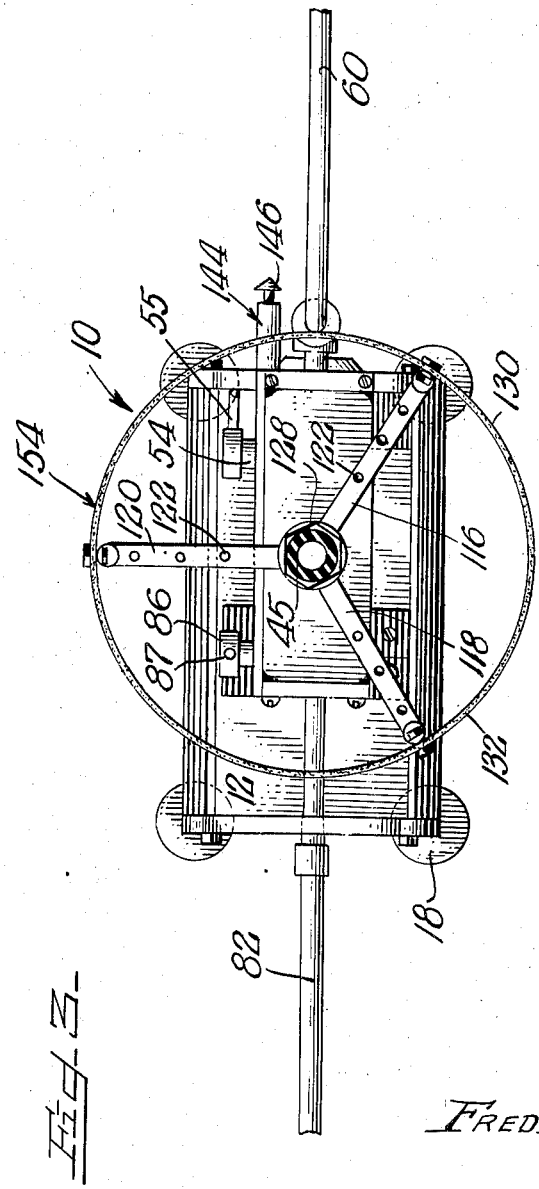

Patented May 31, 1949

2,471,721

UNITED STATES PATENT OFFICE 2,471,721

SANITARY DRINKING GLASS CLEANER

Fred William Bunch, Green Bay, Wis.; Emily E. Bunch, administratrix of said Fred William Bunch, deceased, assignor of thirty-three and one-third per cent to Emily E. Bunch, Green Bay, Wis., thirty-three and one-third per cent to Frederick W. Bunch, Jr., and thirty-three and one-third per cent to Benjamin Bunch, both of Eau Claire, Wis.

Application February 27, 1945, Serial No. 579,910

21 Claims. (Cl. 134—50)

This invention relates to an appliance for restaurants, soda fountains and similar public places, and has for its principal object to provide efficient and convenient means for washing and sterilizing eating and drinking utensils to prevent the spread of disease through the common use of such utensils.

Another object of this invention is to selectively spray a single glass or similar receptacle or utensil inside and outside with a sterilizing agent and with a clear rinse fluid to remove all traces of prior use and to reduce the bacterial count.

A further object of this invention is to provide a compact glass or bottle washing device that will wash and rinse a glass in a single automatic operation, responsive to the physical positioning of the glass in the device.

Another object of this invention is to provide a glass or receptacle washing and rinsing spray apparatus that will function automatically to perform the successive washing and rinsing operations, responsive to movement of the spray unit.

A still further object of this invention is to provide an efficient bottle or glass washing apparatus or device that may be easily installed for use on a bar or soda fountain, in view of the general public, whereby a glass may be conveniently cleaned and sterilized by an operator without leaving his working zone and without injuring his hands with hot water or sterilizing fluid.

Another object of this invention resides in the incorporation of a disinfecting fluid and natural rinse fluid in the same apparatus, which are selectively sprayed on a glass by means of a common pressurized spray, so that successive operations result in a clean and germ-free glass.

A meritorious feature of this invention resides in the provision of a housing, having fluid inlet conduits and a spray unit mounted on the housing in potential communication with the inlet conduits, the communication being selectively produced by oscillatory movement imparted to the spray unit responsive to the physical positioning of the receptacle or glass thereon.

Another important feature of this invention resides in the provision of means for conveying a disinfectant under pressure to a mixing chamber for intermixing with a fluid from one of the inlets disposed in the housing and for discharging the disinfecting fluid onto the receptacle.

Another object of this invention to be specifically herein enumerated resides in the provision of a novel and compact device for washing and sterilizing a receptacle in one operation, the device being reliable and durable in operation and economical to manufacture.

These and ancillary objects and other meritorious features are attained by this invention, a preferred embodiment of which is set forth in the following description and illustrated in the accompanying drawings, wherein:

Figure 1 is a side elevational view of this invention;

Figure 2 is a vertical sectional view taken substantially on the plane of line 2—2 of Figure 1; and Figure 3 is a top plan view.

Referring now more particularly to the drawings wherein similar characters of reference designate corresponding parts throughout and wherein a preferred embodiment of this invention is set forth, by way of illustration only, the numeral 10 generally designates this invention, which comprises a casing or housing 12 supported by legs 14 and 16. The terminals of the legs may be provided with cushion or vacuum cup feet 18 to support the casing on any suitable base or horizontal support in an immovable manner.

A piston 20 is slidably mounted within a cylinder 22 between the end walls 24 and 26, and divides the cylinder into two separate chambers 28 and 30. The chamber 28 serves as a high pressure chamber, while the chamber 30 functions as a low pressure chamber, for a purpose to be later described. A drain and relief valve 32 extends from the high pressure chamber 28 through the end wall 24 and a similar relief or cock valve 34 is disposed through the end wall 26 in communication with the chamber 30 for draining fluid therefrom.

Offset from the chamber 30 is a disinfectant receptacle or cup 36, which is in communication with the chamber 30 through a port 38. A manual valve 40 having an extending handle 42 controls the communication between the receptacle and the chamber, a resilient member 44 being received on the valve stem for normally biasing the valve into a closed placement, closing off the communication between the receptacle and the chamber.

A passage 46 is vertically disposed in the end wall 26 of the casing and extends upwardly through a top block 45. An orifice 48 formed between the port 38 and the chamber 30 communicates the passage with the chamber. The passage 46 angularly extends in a horizontal plane, as at 50, through the top block. A vertical passage 52 communicates with the passage 50 and is controlled by a manually operated cock valve or the like 54, which is actuated by a hand lever 55, as seen in Figure 1 of the drawings. A vertical passage 56 formed in the block 45 extends from the horizontal passage 50 and leads into a horizontal bore 58. The bore or passage 58 is adapted to receive at one end an inlet conduit or pipe 60, whereby fluid may be conveyed from a suitable supply source, not shown. The horizontal bore or passage 58 is in lateral communication with a centrally disposed chamber 62 and terminates in a restricted valve seat 64. A valve 66, having longitudinal side ribs 68, is normally seated in the valve seat 64, the stem of the valve being suitably formed at one end to accommodate a stop plate or the like 65. A spring is received around the stem for normally biasing the valve in the valve seat. Extending into the chamber from the valve is an operating boss 70, which serves to unseat the valve and to allow fluid from the inlet or conduit 60 to enter the chamber, as will be described.

Similarly formed in horizontal alignment with the horizontal bore 58 is a horizontal bore or passage 72 terminating in a valve seat 74, adjacent the mixing chamber 62. A valve 76 is normally biased or urged in engagement in said seat by a spring 78, received around the extending stem thereof in abutting engagement with a stop plate 79. An operating stem or boss 80 extends inwardly into the mixing chamber from the valve 76 and an inlet conduit or pipe 82 is connected to the opposite end of the horizontal passage.

Communicating in lateral fashion with the horizontal bore or passage is a vertical passage 84, which is controlled by a cock valve 86 or the like through the medium of a handle or lever 87 disposed on the exterior of the housing. An inverted L-shaped passage 88 communicates with the passage 82, the depending portion of the passage 88 extending into the chamber 28.

Extending longitudinally below the passage 88 and the passage 50 is a drainage chamber 90. A passage 92 connects the drainage chamber 90 with the mixing chamber 62, with suitable means disposed in the passage for controlling the discharge of the fluid from the mixing chamber into the drainage chamber. The means preferred comprises a valve, such as a ball valve, or the like 94, which is normally seated on a valve seat formed in the passage adjacent the mixing chamber. A spider 96 having circumferentially disposed vertical openings 97 formed in the sides thereof is received on a valve stem 98 which depends into the passage and extends through a plate 100, the extending end of the stem being suitably threaded and having received thereon a stop nut or the like 102. Suitable apertures 104 are formed in the plate 100 on either side of the stem 98. A resilient element, such as a compression spring or the like 106 is received around the valve stem, and serves to bias or urge the valve 94 from its seat when there is no fluid pressure in the mixing chamber 62, so that any fluid therein may be drained through the openings 104 into the chamber 90.

Swingably or oscillatably mounted in a bearing block 150 seated on top of the mixing chamber 62 is a spray unit 154. A tube 110 is inserted into a ball 112 received in a socket in the block so that the tube may be moved in various angular positions relative to the socket. A coaxially reduced lever 108 extending downwardly from the tube 110 protrudes into the mixing chamber 62 and is interposed between the inwardly directed operating bosses of the valves. A connection 114 is received on the tube above the ball socket 112 and accommodates diverging spray arms 116, 118 and 120. The spray arms or pipes are disposed apart equidistantly and are turned up vertically to terminate slightly above the upper end of the tube 110. Downwardly struck spray perforations 122 are provided in the upper ends of the arms to direct the spray toward the tube. Discharging apertures 129 are disposed in the tube just below the cushioning cup for spraying the liquid outwardly from the tube.

Annular bands 130 are received on the outside of the arms and are secured thereto by any suitable securing means. The bands serve to retain a drum 132 around the arms and around the inner vertical tube so that fluid is retained adjacent the receptacle and is prevented from spraying the surrounding area. Angle irons 160 are seated on the upper ends of the arms 116, 118 and 120 and serve a dual function in that they close off the arms and support the upper annular band, which is secured thereto by a conventional bolt assembly 162.

In operation, the valve 86 is turned through the medium of the extending lever into an open position in the passage and the valve 54 is closed. Thus, communication is established between the inlet, from the conduit 82, and the fluid enters through the passage 88 into the chamber 28. The pressure created by the fluid moves the piston relative to the low pressure chamber and, at the same time, the spray unit is oscillated so that the lever end contacts the operating boss 70 of the valve 66 and moves the valve out of the valve seat 64. Disinfectant may be admitted into the low pressure chamber, through the medium of the valve 40 and is conveyed into the mixing chamber 62. The disinfecting fluid and the fluid from the opened inlet 58 is conveyed under pressure to the perforations in the arms and the tube and sprays the glass or receptacle positioned thereon. By swinging or oscillating the spray unit relative to the operating boss 80, the inlet 58 is closed off and communication is established between the passage or inlet 72 advancing the clear rinse fluid from the conduit 82 through to the arms and the tube for rinsing the receptacle or glass.

The tube 110 is provided with opposed apertures 142, which allows the fluid from the inlets and from the disinefecting or low pressure chamber to enter the tube and through the connection be conveyed to the arms and on to the glass or receptacle.

After the disinfecting and rinsing operations are selectively performed through the selective positioning of the spray unit, the tube 110 is vertically placed in the mixing chamber. The valve 94 is then biased upwardly, due to the lack of fluid pressure in the mixing chamber, and any fluid remaining in the tube or arms is allowed to drain through the opening 92 and the openings 104 into the discharge chamber 90, from which it may be drained by means of a suitable drain or relief valve.

To refill the low pressure chamber, the valve 86 is closed and the valve 54 is opened, allowing the fluid from the conduit 60 to enter through the horizontal passage through the vertical passage 52 into the low pressure chamber. The piston is then moved into the high pressure chamber and the apparatus is ready for successive use.

An indicating device 144 extends through the wall 26 and comprises a cone-shaped head 146, having a stem 140 which is integrally formed with a disk end 148 inserted in the chamber. A spring 152 is received around the stem between the disk 148 and the end of the housing 160 for the stem to normally retain the indicating cone against the extending portion of the housing. However, when the piston is moved by the fluid pressure from the high pressure chamber toward the wall 26, it engages and moves outwardly the disk, causing the cone 146 to be spaced from the end of the housing. This indicates that the low pressure chamber 30 is empty and must be refilled, as noted above.

Thus, it can be seen that the fluid pressure in the high pressure chamber 28 is maintained the same as that in the inlet conduit 82 from a main supply source, the pressure in the chamber operating against the piston and creating an equal pressure in the low pressure chamber to feed the contents thereof through the passage 46 into the common feeding chamber, where it is intermixed with the fluid coming through the inlet conduit 60. Then, by reversing the pressure toward arrow b, the valve 66 will seat itself, closing the inlet passage 58 and, at the same time, the operating lever of the tube will move against the extending or projecting boss of the valve 76 and will open the valve. Thus, clean or natural rinse fluid is admitted from the inlet conduit 82, through the horizontal bore or passage 72, the apertures in the tube, and pressurized to pass through the spray pipes and tube, cleaning the glass inside and out from the sterilizing liquid.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A receptacle cleansing apparatus comprising a cylindrical housing, a piston operable in said housing defining a low pressure and a high pressure chamber, fluid inlets in said housing, means for admitting a disinfectant into said low pressure chamber, a spray unit swingably mounted on the housing and interposed between the inlets, control valves for said inlets, one of said fluid inlets being in communication with the high pressure chamber, means for establishing communication between another of said inlets and the spray unit and also between the low pressure chamber and the spray unit, and means for closing off said last-named communication and establishing communication between the first inlet and the spray unit, said means being selectively actuated by an oscillatory movement of the spray unit.

2. A receptacle cleansing apparatus comprising a housing, a piston operable in the housing defining a high pressure and a low pressure chamber, fluid inlets in said housing, a common chamber interposed between said inlets, a spray unit swingably mounted on the housing and extending into the common chamber and communicating therewith, one of said inlets having selective communication with the high pressure chamber, means for admitting a disinfectant into the low pressure chamber, means for selectively establishing a communication between the common chamber and the low pressure chamber and between either of the inlets and the common chamber.

3. The combination of claim 2, wherein said disinfectant admitting means includes a valved inlet in said housing in communication with the low pressure chamber.

4. The combination of claim 2, wherein said fluid inlets include horizontal bores in said housing, conduits disposed at one end of the bores, said common chamber being interposed between said bores, control valves seated in said bores adjacent the common chamber, means extending into the common chamber from said valves for unseating the valves responsive to an oscillating movement of the spray unit and resilient means for normally biasing said valves into seated placement.

5. The combination of claim 2, and means for closing off the communication between one of the inlets and the high pressure chamber, a drain valve in said high pressure chamber for exhausting the fluid therein, and means for filling said low pressure chamber from the other of said inlets.

6. The combination of claim 5, and means actuated by the piston for indicating the loss of fluid in the low pressure chamber.

7. The combination of claim 2, including a drainage chamber in said housing, a valved passage between said drainage chamber and the common chamber, means for establishing a communication between said chambers upon a decrease of pressure in the common chamber.

8. A receptacle cleansing apparatus comprising a housing, fluid inlets in said housing, axially aligned control valves for said inlets, a common chamber interposed between said valves, a bearing block mounted on the housing, a spray unit swingably mounted on the block, means carried by said spray unit for selectively actuating said valves and establishing a communication between either of the inlets and the spray unit.

9. The combination of claim 8, wherein said block includes a central socket, a bearing carried by said spray unit received in said socket for effecting oscillatory movement of the spray unit.

10. The combination of claim 8, including operating bosses extending inwardly into the common chamber from said valves, a lever on said spray unit interposed between said bosses for selective engagement therewith to unseat the valves responsive to movement of the spray unit.

11. A receptacle cleansing apparatus comprising a housing, a piston operable in said housing defining a low pressure and a high pressure chamber, means for conveying a disinfectant fluid into said low pressure chamber, a spray unit swingably supported on said housing, a connection between the low pressure chamber and the spray unit, means responsive to an oscillatory movement of the spray unit for establishing a communication through said connection between the low pressure chamber and spray unit, an inlet for fluid under pressure associated with the housing and communicating with the high pressure chamber, means for controlling said communication of the inlet with the high pressure chamber and means for establishing a communication between the inlet and the spray unit.

12. A receptacle cleaning apparatus comprising a housing, a piston operable in said housing defining a low pressure chamber and a high pressure chamber, means for admitting a detergent fluid to said low pressure chamber, a spray unit swingably supported on said housing, an inlet for fluid under pressure associated with said housing and communicating with the high pressure chamber, a connection between the low pressure unit and the spray unit, means actuated by a swinging movement of the spray unit for establishing a communication between the low pressure chamber and the spray unit whereby the piston reacts to the pressure from the fluid in the high pressure chamber to advance the detergent fluid through the connection to the spray unit, and means for selectively establishing a communication between the inlet and the spray unit.

13. A receptacle cleaning apparatus comprising a housing, a piston operable in said housing and defining a high pressure chamber and a low pressure chamber, an inlet for fluid under pressure associated with the housing and communicating with the high pressure chamber, means for admitting a detergent fluid into said low pressure chamber, a spray unit swingably supported on said housing, a connection between the low pressure chamber and the spray unit, a valve associated with said connection and actuated by the spray unit to establish a communication through the connection between the low pressure chamber and the spray unit, conduit means between the inlet and the spray unit, means associated with the conduit means and actuated by the spray unit for establishing communication through the conduit means between the inlet and the spray unit.

14. A receptacle cleansing apparatus comprising a housing, a piston operable in said housing defining a low pressure chamber and a high pressure chamber, a fluid inlet associated with said housing and communicating with the high pressure chamber, a valved inlet connection associated with the housing and communicating with the low pressure chamber for admitting a detergent fluid into said low pressure chamber, a spray unit swingably supported on the housing, conduit means disposed between said low pressure chamber and the spray unit, a valve associated with said conduit means and actuated by the spray unit for establishing communication between the low pressure chamber and the spray unit through the conduit means, a connection between the fluid inlet and the spray unit, a valve associated with said connection and actuated by the spray unit for establishing communication between the spray unit and fluid inlet.

15. A receptacle cleaning apparatus comprising a housing, an inlet for a fluid under pressure connected with the housing, means for admitting a detergent fluid into said housing, a spray unit supported on the housing, conduit means between said housing and the spray unit, means associated with said conduit means for establishing communication between said housing and spray unit and means in said housing responsive to said foregoing means and reactive to said fluid under pressure for advancing the detergent fluid through the conduit means into the spray unit.

16. A receptacle cleansing apparatus comprising a housing, a piston operable in the housing defining a high pressure and low pressure chamber, an inlet for a fluid under pressure associated with said housing and communicating with the high pressure chamber, means for admitting a detergent fluid to said low pressure chamber, conduit means between said low pressure chamber and the spray unit, control means associated with said conduit means, said control means being actuated by the spray unit for establishing communication between the low pressure chamber and the spray unit whereby the piston is activated by the pressure created in the high pressure chamber to urge the detergent fluid through the conduit means, a connection between said fluid inlet and the spray unit, control means associated with said connection and actuated by said spray unit for establishing selective communication between the inlet and the spray unit.

17. The combination of claim 16, wherein said control means are coaxially aligned and are separated by a common chamber, said spray unit terminating in an actuating member interposed in said chamber between the control means and means associated with said chamber for draining the same, said means being automatically actuated responsive to a neutral positioning of the actuating member with respect to both of the control means.

18. A receptacle cleaning apparatus comprising a housing, a piston operable in said housing defining a high pressure and low pressure chamber, an inlet for a fluid under pressure associated with the housing and communicating with the high pressure chamber, means for admitting a detergent fluid to said low pressure chamber, a spray unit swingably supported on said housing, conduit means connected between said low pressure chamber and the spray unit, control means associated with said conduit means, said control means being actuated by the spray unit for establishing communication between the spray unit and the low pressure chamber, whereby the low pressure chamber is vented and the piston rendered reactive to the pressure created in the high pressure chamber, a connection between said inlet and spray unit, control means actuated by the spray unit associated with the connection, means for indicating the exhausting of the detergent fluid in the low pressure chamber, and means for refilling said low pressure chamber.

19. The combination of claim 18, wherein said last means includes means for closing off the communication between the inlet and high pressure chamber, a drain valve for said chamber, a second fluid inlet associated with the housing and communicating with the low pressure chamber, valve means associated with said last inlet.

20. A receptacle cleaning apparatus comprising a housing, a piston operable in the housing defining a high pressure chamber and a low pressure chamber, a block mounted on said housing and formed with a chamber, a spray unit swingably supported by said block and depending into said chamber and communicating therewith, an inlet for a fluid under pressure associated with the block chamber and communicating with the high pressure chamber, control means interposed between the first inlet and the block member, conduit means between the low pressure chamber and the block chamber, means for admitting a detergent fluid into said low pressure chamber, a second fluid inlet associated with said block chamber, said conduit means communicating with the second inlet, control means associated with said second inlet, said last control means being actuated by said spray unit for establishing a communication between the low pressure chamber and the block chamber and between the second inlet and the block chamber, said first control means being actuated by the spray unit for establishing communication between the first inlet and the block chamber, and drainage means for said block chamber, said last means being responsive to a neutral positioning of the spray unit with respect to both of the control means.

21. A receptacle cleaning apparatus comprising a housing, a piston operable in said housing defining a low pressure and a high pressure chamber, means for conveying a disinfectant fluid into said low pressure chamber, a spray unit associated with the housing, conduit means between said low pressure chamber and the spray unit, means associated with said conduit means for establishing a communication through said conduit means between the low pressure chamber and the spray unit, means for conducting fluid under pressure to the housing communicating with the high pressure chamber, and means for establishing a direct communication between the last mentioned means and spray unit.

FRED WILLIAM BUNCH.

REFERENCES CITED

The following references are of record in the file of this patent:

UNITED STATES PATENTS

| Number | Name | Date |
|---|---|---|
| 434,430 | Danks | Aug. 19, 1890 |
| 851,584 | Bundy | Apr. 23, 1907 |
| 1,023,630 | Elkins | Apr. 16, 1912 |
| 1,106,430 | Weaver | Aug. 11, 1914 |
| 1,342,485 | Wiltsie | June 8, 1920 |

FOREIGN PATENTS

| Number | Country | Date |
|---|---|---|
| 109,099 | Australia | Nov. 13, 1939 |